May 10, 1938.  C. H. COLVIN  2,116,508

AIRCRAFT NAVIGATING INSTRUMENT

Filed Aug. 11, 1933  5 Sheets-Sheet 1

INVENTOR.
Charles H. Colvin.
Maxwell E. Sparrow
BY
ATTORNEY.

May 10, 1938.  C. H. COLVIN  2,116,508
AIRCRAFT NAVIGATING INSTRUMENT
Filed Aug. 11, 1933   5 Sheets-Sheet 3

May 10, 1938. C. H. COLVIN 2,116,508
AIRCRAFT NAVIGATING INSTRUMENT
Filed Aug. 11, 1933  5 Sheets-Sheet 4

Patented May 10, 1938

2,116,508

UNITED STATES PATENT OFFICE 2,116,508

AIRCRAFT NAVIGATING INSTRUMENT

Charles H. Colvin, Point Pleasant Beach, N. J.

Application August 11, 1933, Serial No. 684,626

10 Claims. (Cl. 235—61)

This invention relates to aircraft navigating instruments. It comprises in part a development from and is an improvement upon the invention described in the co-pending joint application of Henry F. Colvin and myself for Indicators, Serial Number 626,514 and filed July 30th, 1932. References will be made herein to that application.

This invention, while utilizing the basic features of said previous invention, comprises an improvement upon said previous invention and upon all ground speed and distance devices previously known to me, inasmuch as such previous devices are useful only so long as the ground can be observed or so long as the air speed and heading at the time of observation are maintained, whereas the device of the present invention continues to operate correctly after change of either air speed or heading, or both, so long as the wind has not changed or so long as the changes of the wind are known.

It is an object of this invention to provide an aircraft indicator of direction of heading of the aircraft, drift angle, direction of wind, velocity of wind, air speed, ground speed, and ground distance.

It is a further object of this invention to provide an aircraft navigating instrument by which may be determined and indicated the velocity and direction of the wind blowing upon the aircraft, and the drift angle of the aircraft; and whereby, by the use of these factors and the known heading and air speed of the aircraft, its ground speed, ground distance and course may be continuously indicated.

It is a further object of this invention to provide a device incorporating indicators of wind direction, wind velocity, air speed and course, and indicators of drift angle, heading, ground speed and ground distance, whereby the last four factors may be correctly indicated for any combination or variation of the first four factors.

It is a further object of this invention to provide a continuously integrated indication of the distance traveled by an aircraft in respect to the ground, and to maintain the accuracy of such indication in spite of all known changes in wind direction, wind velocity, air speed, heading, drift and course.

Further objects of this invention are to provide methods of determining the ground speed of an aircraft in flight, determining the velocity and direction of the wind with respect to an aircraft in flight, indicating a function of the ground speed of the aircraft in flight, determining the proper heading of an aircraft to correspond with a desired course, and determining the course of the aircraft.

A further object of this invention is to provide a method of determining the velocity and direction of the wind with respect to an aircraft in flight and of indicating a function of the ground speed of the craft, by the use of a mechanical triangle.

These and other objects of the invention and the means for their attainment will be more apparent from the following detailed description, taken in connection with the accompanying drawings showing diagrammatic representations and illustrating a preferred embodiment by which the invention may be realized, and in which.

Figure 1:
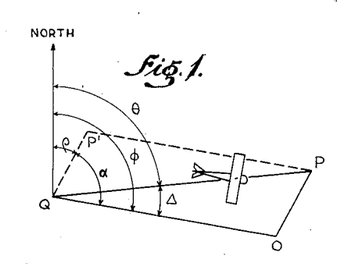
Fig. 1 is a diagram illustrating the problem to be solved.

The diagram of Figure 1 is presented to assist in explaining the problems of air navigation which this invention is intended to solve. In this diagram Q-North is the north direction which serves as a base for measuring other directions, QO is the direction of heading of the aircraft, at an angle $\Phi$ from the north direction, QP' is the direction in which the wind is blowing, at an angle $\rho$ from the north direction, (wind is commonly "named" by the direction from which it is blowing, or the angle $\rho+180°$).

QP is the diagonal of a parallelogram drawn with P'P parallel to QO and OP parallel to QP', and is the direction in which the aircraft is actually moving in respect to the ground, or at an angle $\theta$ from the north direction.

The value of the velocity $w$ of the wind is represented by the length of the lines QP' or OP. The air speed $v$ of the aircraft is represented by the length of the line QO, and the ground speed V, or actual speed of the aircraft in respect to the ground, is represented by the length of the line QP. The angle of drift is $\Delta=\Phi-\theta$, and the angle between the direction of heading and the direction in which the wind is blowing is $\alpha$.

The problems intended to be solved by the device of this invention are:

1. Knowing the air speed, the altitude and the heading, and observing the ground: to determine (a) the angle of drift, (b) the course, (c) the direction of the wind, (d) the velocity of the wind, (e) the ground speed and (f) the distance traveled in respect to the ground.

2. Knowing the direction and velocity of the wind (either from the above determination or from independent information): to determine (a) the angle of drift, (b) the course, (c) the ground speed, and (d) the ground distance, for any heading and any air speed.

3. By maintaining the positions of the various indicators of the device in accordance with the known or determined air speed, heading, drift and wind, to obtain a continuous record of ground distance, or in other words a "log" of ground distance, which is both useful in itself and which gives a basis for the continuous determination of position. Apparatus for such determination of position will form the subject of other applications for Letters Patent.

Figure 2:
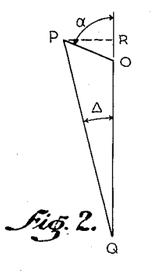
Figs. 2 and 3 are diagrams illustrating the theory of the procedure of solution.
Figure 3:
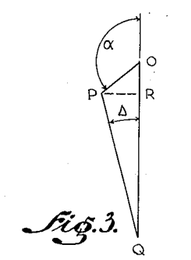

Having thus stated the problems to be solved, and indicated broadly the purposes of this invention, Figures 2 and 3 are presented to illustrate the theoretical basis of the mechanism proposed to effect the solutions. Using the same rotation as in Figure 1, in both Figures 2 and 3:

QO=$v$= air speed,
OP=$w$= wind velocity,
QP=$V$= ground speed, and
$\Delta$= angle of drift.

In each figure a perpendicular PR has been dropped from point P to line QO or its prolongation, and the angle $\alpha=\Phi-\rho=$the angle between the direction of heading of the aircraft and the direction in which the wind is blowing. The distance OR=$w \cos \alpha$ and may be called the component of the wind acting to increase the speed of the aircraft over the ground in the direction of its heading, and QR=$v+w \cos \alpha$, or the speed of the aircraft over the ground in the direction of its heading.

It will be noted that in Figure 3 QR is less than QO. QR=$v+w \cos \alpha$, nevertheless, since $\alpha$ is more than 90° and less than 270°, and $\cos \alpha$ is therefore negative. Finally it will be noted that QP which=

$$V=\frac{v+w \cos \alpha}{\cos \Delta}$$

Figure 4:
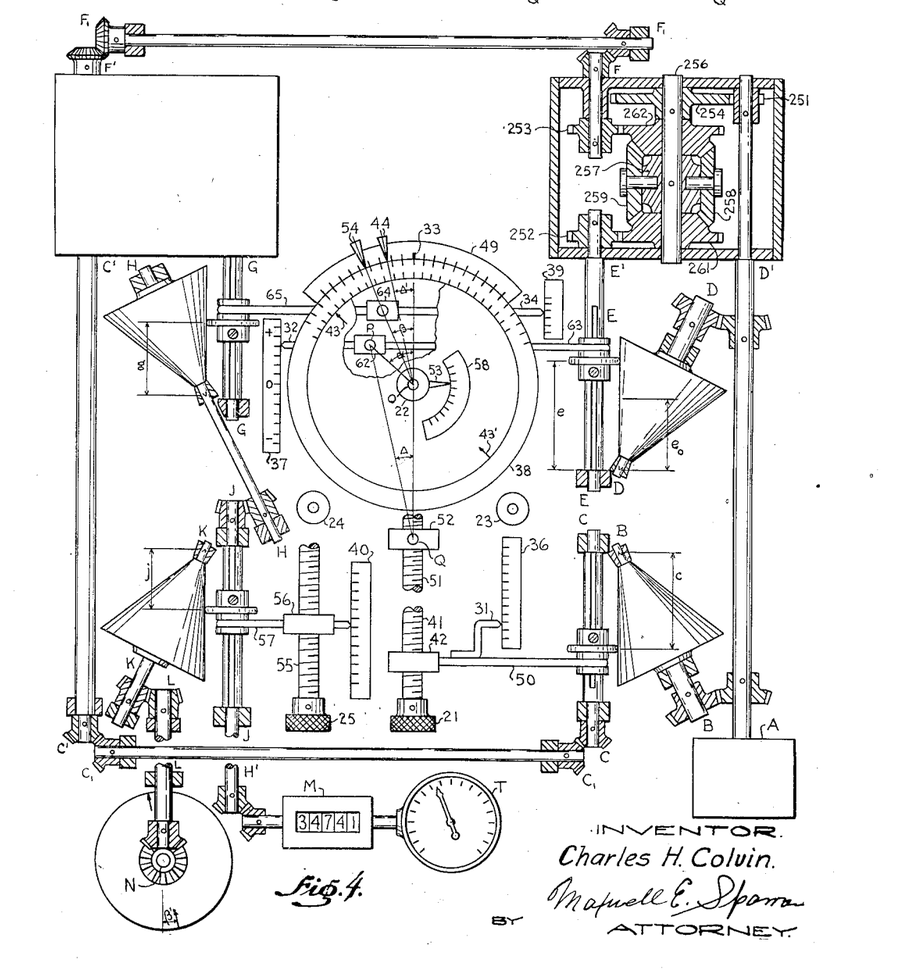
Fig. 4 is a diagrammatic representation of the whole device, the structure of the various parts of which is shown in the following figures.

Ground distance S is indicated by a continuous integration of V in respect to time $t$. It therefore follows that the mechanism of the device of this invention is concerned with the measurement and/or indication of the factors:

$\Phi=$ heading
$\theta=$ course
$\Delta=$ drift angle
$v=$ air speed
$w=$ wind velocity
$\rho=$ wind direction, in respect to north
$\alpha=$ wind direction, in respect to heading
$V=$ ground speed
$t=$ time, and
$S=$ ground distance The fundamentals of the mechanism will now be explained by reference to Figure 4 which is a diagrammatic representation of the elements of the device. To avoid unnecessary complication of the drawings, and to make it easier to understand, those elements which are illustrated in structural detail in Figures 5 to 10 are here shown in elementary diagrammatic form, and the connections between certain elements are omitted. The explanation will make clear the relation of all parts to each other and to the whole device. For further simplification each major element has been designated by a letter which represents both the element itself and the axis about which it turns.

Power for operating the device is furnished by an element A operating as a function of time. This may be an electric motor with constant speed control, a clock mechanism, or other constant speed power means, or it may be a manually operated device the number of revolutions of which are made proportional to the elapsed time. Details of the constant speed control form no part of the present invention.

From the power source A are driven the "air speed" cone B and the "component wind" cone D, both of which turn at constant speed. It will be understood that any suitable gearing may be introduced between power source A and cones B and D, so that while each cone will rotate at a constant speed, such speed is not necessarily that of the power source nor of the other cone.

Driven from cone B is "air speed" wheel C. The speed at which wheel C will rotate will depend upon its position of contact with an element of cone B, and will be a function of the speed of cone B and of the distance $c$ of the point of contact from the apex of the cone. The position of the wheel C is adjustable by means of knob 21 which turns a threaded shaft 41 on which is carried a threaded follower 42. This follower 42 carries a wheel actuator 50 and a pointer 31 which indicates the position of wheel C on a scale 36. Scale 36 will normally be graduated in units of air speed $v$, and its indication will be a function of the distance $c$ from the apex of the cone to the point of contact of the cone with the wheel C.

Driven from cone D is "component wind" wheel E. The speed at which wheel E will rotate will depend upon its position of contact with an element of cone D, and will be a function of the speed of cone D and of the distance $e$ of the point of contact from the apex of the cone. The position of the wheel E is determined by the position of the block 62 which is movable in respect to the axis O, both angularly and radially. The position of block 62 corresponds to that of point P in the diagrams of Figures 1, 2, and 3. The radial position of the block 62 is controlled by the knob 22 and its distance from the axis O is indicated by index 53 on scale 58, in units of velocity $w$ of the wind. Its angular position is controlled by a knob 23. This knob 23 can be used to orient block 62 and index 43 in reference to dial 38 and index 33, or to orient block 62, index 43 and dial 38 in reference to index 33. The reasons for this dual function will later be apparent.

Block 62 carries a wheel actuator 63 so arranged that the position of wheel E will correspond with the distance of block 62 above or below axis O. As the radial distance of the block 62 from axis O is a function of wind velocity $w$, and the angle of index 43 from index 33 is $\alpha$, the distance of block 62 above or below axis O may be expressed as $w \cos \alpha$. Block 62 carries an index 32 readable against scale 37. Scale 37 is graduated plus and minus, in units of component wind, and for any value of $w$ on scale 58, shows the corresponding value of $w \cos \alpha$. For the position of block 62 when $w \cos \alpha = 0$, that is, when the angle $\alpha$ is 90° or 270° or $w = 0$, the position of wheel E will be such that the diameter of the cone at the point of contact bears a definite relation to the diameter of the wheel. Though not necessary to the functioning of the device, it will be assumed for simplicity of explanation that at this point, when $w \cos \alpha = 0$, the diameter of the cone D is equal to the diameter of wheel E. Hence the speed of rotation of wheel E will be equal to the speed of rotation of cone D. (This assumes no slippage between cone and wheel, a condition which can be obtained in practice with sufficient accuracy for the purpose of this device). The speed of the wheel E at other positions along its element of contact with the cone D will be a function of the position of the block 62 as expressed by the term $w \cos \alpha$ and of the distance $e$ of the point of contact from the apex of the cone. The diameter of the cone D at any point of contact may be expressed as $ke$, $k$ being a constant. If the distance from the apex of the cone D to the point of contact of the wheel E corresponding to a position of block 62 where $w \cos \alpha$ equals 0 be expressed as $e_0$, the diameter of the cone at this point, and also the diameter of the wheel E, is $ke_0$. For any position of the wheel in contact with the cone, the speed of the wheel will be $$\frac{ke}{ke_0}$$

times the constant speed of the cone D. If this constant speed be called $d$, the speed of wheel E will be $$\frac{de}{e_0}$$

We may express $e$ in terms of $w \cos \alpha$ as $e_0 + w \cos \alpha$ (taking due account of the negative value of $\cos$ from 90° to 270°) and express the speed of wheel E as $$\frac{d(e_0 + w \cos \alpha)}{e_0}$$

or as $$d + \frac{dw \cos \alpha}{e_0}$$

Returning now to the axis O and the parts associated therewith, mechanism is provided for establishing and maintaining the air speed-wind-ground speed triangle. This mechanism is not shown in Figure 4 but will be found exposed in detail in Figures 6, 7, 8, and 9. The points of the triangle are shown in Figure 4 and for the purpose of explanation of the function of the device as a whole this particular mechanism need not now be examined in detail. The triangle is established by the axis O, the point P which marks the location of block 62, and point Q, marking the location of a movable block 52. This triangle forms the same diagram of air speed, wind and ground speed as in Figures 1, 2, and 3. Air speed $v$ is represented by the distance QO in the direction toward O, wind $w$ by the distance OP in the direction toward P and ground speed V by the distance QP in the direction toward P. The distance QO is determined as a function of air speed by means of the knob 21, in the same operation by which the position of wheel C is determined as a function of air speed. Point Q (block 52) may be moved toward or away from axis O by turning knob 21 which turns shaft 51. Shaft 51 carries block 52. Shaft 51 may be an extension of shaft 41, but may or may not have a thread of the same pitch as the thread of shaft 41, depending upon the constants selected in the design of the mechanism.

The index 33, above referred to, represents the direction of heading $\Phi$ of the aircraft. The index 43 represents the direction of the wind $\rho$, and the angle $\alpha$, being the angle between the index 33 and the index 43, is the angle between the direction of the heading $\Phi$ and the direction of the wind $\rho$. The direction of the heading $\Phi$ and of the wind $\rho$, in reference to North, is shown by the scale 38, against which both index 33 and index 43 are readable. As wind is commonly expressed in terms of the direction from which it is blowing, indication of this is also provided, by the index 43', 180° removed from index 43.

The angle OQP is the angle of drift $\Delta$. Means not shown in Figure 4, but exposed in detail in Figures 6, 7, 8, and 9 are provided for transferring the indication of this angle as $\Delta'$ to index 44 on scale 49, of which index 33 is the zero mark.

The component of the wind which increases the speed of the aircraft over the ground, in the direction of its heading, is equal to its velocity $w$ times the cosine of the $\alpha$ which it makes with the heading, or $w \cos \alpha$. (When $\cos \alpha$ is negative, the wind decreases the speed of the aircraft in the direction of heading.)

Returning to wheel E, the speed of which was shown to be $$d + \frac{dw \cos \alpha}{e_0}$$

the shaft of this wheel E drives one input side E' of a differential gear system E'D'F, the other input side D' of which is driven at constant speed as is the shaft of cone D. It must be understood that any gearing may be introduced between shaft D and shaft D' and between shaft E and shaft E', so that the speeds of D' and E' may not be the same as the speeds of D and E. For the assumption of the diameter of the wheel E being equal to the diameter of the cone D when $w \cos \alpha = 0$, the ratio of speed of E' to E will be the same as the ratio of D' to D. Had the diameter of cone D, when $w \cos \alpha = 0$, been assumed as $k_1$ times the diameter of wheel E, the ratio of speed of D' to D will be $k_1$ times the ratio of speed of E' to E.

The differential gear system E'D'F comprises an input shaft D' carrying gear 251, an input shaft E' carrying gear 252 and an output shaft F carrying gear 253. Gear 251 meshes with gear 254 which is carried on shaft 256. Shaft 256 also carries a block 257 on which are journalled differential gears 258 and 259. These gears mesh with gear 261 which turns freely on shaft 256 and meshes with gear 252, and gear 262 which turns freely on shaft 256 and meshes with gear 253.

The differential gear system E'D'F is so designed that the output speed F equals the input speed E' minus the input speed D'. That is, when the speed of wheel E exceeds the speed of cone D the rotation of shaft F will be in a direction which may be called positive; when the speed of wheel E equals the speed of cone D the shaft F will be stationary; and when the speed of wheel E is less than the speed of cone D the rotation of shaft F will be in a direction which may be called negative. As the speed of wheel E has been shown to be $$d + \frac{dw \cos \alpha}{e_0}$$

and the speed of cone D is $d$, the speed of F will be a function of $$\left(d + \frac{dw \cos \alpha}{e_0}\right) - d$$

which equals $$\frac{dw \cos \alpha}{e_0}$$

The speed of F is therefore a function of $w \cos \alpha$, which is the amount by which the wind increases the speed of the aircraft in the direction of its heading.

Returning now to air speed wheel C, the speed of which was shown to be a function of air speed, the shaft C is connected through shaft $C_1$ to one input side C' of a second differential gear system C'F'G. To the other input side F' of this system is, through shaft $F_1$, connected output shaft F of differential gear system E'D'F, which has just been shown to have a speed which is a function of $w \cos \alpha$. Suitable gearing is interposed between shaft C and shaft C' and between shaft F and shaft F' so that shaft C' turns at a speed of $k_2 v$ and shaft F' turns at a speed of $k_2 w \cos \alpha$, $k_2$ being any suitable constant.

The differential gear system C'F'G, which is identical with system E'D'F, is so designed that the output speed of shaft G is equal to the sum of the speeds of input shafts C' and F', when F turns in the direction which has been designated as "positive". The speed of shaft G is therefore equal to $k_2(v + w \cos \alpha)$, $v + w \cos \alpha$ being the velocity of the aircraft over the ground, in the direction of its heading.

Carried on shaft G, or connected to it by any convenient gearing, is "drift" wheel G, which therefore turns at a speed which is a function of $v + w \cos \alpha$. Wheel G drives "drift" cone H. The speed of cone H is a direct function of the speed of wheel G and an inverse function of the distance $g$ of their point of contact from the apex of cone H. This position is determined by the position of block 64 which is orientable about axis O at a fixed radius. The angular positon $\beta$ of block 64 in respect to index 33 is shown by pointer 54 which reads against scale 49. Block 64 and index 54 are controlled by knob 24, which also controls the angular position of the synchronizer N, later to be described. By bringing pointer 54 into coincidence with pointer 44, angle $\beta$ may be made equal to the drift angle $\Delta$, and it is so maintained in the normal operation of the device, as will be later explained.

Block 64 carries a wheel actuator 65 which determines the position of wheel G, and a pointer 34 which indicates in reference to a scale 39 the position of wheel G. This scale will be graduated in any convenient function of drift angle, as explained hereafter. The relation between the position of block 64 and wheel G is established in such a way that the distance $g$ of wheel G from the apex of cone H is a function of the cosine of the angle $\beta$. When $\beta$ is made equal to the drift angle $\Delta$, $g = k_3 \cos \Delta$, where $k_3$ is a constant. The speed of cone H is therefore a direct function of $v + w \cos \alpha$ and an indirect function of $\cos \Delta$, or is equal to $$k_4 \frac{v + w \cos \alpha}{\cos \Delta}$$

where $k_4$ is a constant.

Since $v + w \cos \alpha$ is the velocity of the aircraft over the ground, in the direction of its heading, and $$\frac{1}{\cos \Delta}$$

is the ratio of the velocity in the direction of the path over the ground to the velocity in the direction of the heading, $$\frac{v + w \cos \alpha}{\cos \Delta}$$

is the ground speed V, and the speed of cone H is a function of ground speed.

Counter M is driven from cone H, through shafts J and H', or otherwise. Since the speed of cone H is a function of ground speed, the counter will serve as an integrator of ground speed against time $t$, and the indication of counter M (less its initial indication at time $t_0$) is a function of $$\int \frac{dV}{dt}$$

or a function of ground distance. By selection of suitable gearing between cone H and counter M, the latter may be made to indicate in any desired units of distance, such as miles or kilometers.

A tachometer T may also be driven from cone H. Since the speed of cone H is a function of ground speed, tachometer T may be graduated to read directly in ground speed, in miles per hour, knots, or other units.

However, since ground speed is of primary importance in determining ground distance, and as a continuous integrator and indicator of ground distance has already been provided, it may be found more convenient to indicate ground speed indirectly by means of scales 36, 37, and 39, or by timing the passage of one or more units of distance.

Using scales 36, 37, and 39, it will be noted that scale 36 is graduated in units of air speed $v$, and that scale 37 is graduated plus and minus from zero in units of component wind speed, $w \cos \alpha$. Ground speed in the direction of heading may therefore be determined by adding together the indications of scales 36 and 37. It was previously mentioned that scale 39 might be graduated in any convenient function of drift angle. Suppose it be graduated in terms of $$\frac{1}{\cos \Delta} - 1$$

Ground speed may then be determined conveniently by multiplying the indication of scale 39 by the sum of scales 36 and 37, and adding the result to that sum.

Cone H drives, directly or through gearing, "altitude" wheel J, which therefore turns at a speed which is a function of ground speed V. Wheel J drives cone K. The speed of cone K is a direct function of the speed of wheel J and an inverse function of the distance $j$ of the point of contact of wheel J and cone K, measured from the apex of cone K. The position of wheel J is controlled by knob 25 which turns threaded shaft 55 on which is carried block 56. This block 56 carries wheel actuator 57 and index 35 which cooperates with scale 40. The scale 40 is graduated in units of altitude H as a function of the distance $j$.

Cone K therefore turns at a speed which is a function of $$\frac{V}{H}$$

and drives, directly or through gearing, shaft L of the synchronizer unit N. This may be of any form adapted to be observed in reference to the earth, to be capable of showing actual or apparent linear motion, and to be oriented about an axis which is, or which appears to be, vertical when observed in reference to the earth. This synchronizer may be of the form shown in the copending joint application Number 626,514, above referred to, in which it is demonstrated that the correct speed for such a synchronizer unit is a function of $$\frac{V}{H}$$

Or this synchronizer may be of the forms shown in any of the following Letters Patent: U. S. No. 1,449,387 to Fairchild, U. S. No. 1,664,454 to Hunt et al., U. S. No. 1,786,059 to Fraser, French No. 681,797 to Etablissements Aéra, French No. 680,902 to Hugershoff, British No. 129,634 to Brizon or British No. 414,881 to Colvin et al. The form of such synchronizer unit is not a part of the subject matter of the present invention.

As previously stated, the knob 24 controls the orientation of the synchronizer unit as well as the orientation of the index 54 and block 64. The angle of $\beta'$ of the synchronizer, to one side or the other of its center position, equals the angle $\beta$ of index 54 as measured on scale 49 and, as previously shown, this angle $\beta$ is made equal to the drift angle $\Delta$ by superimposing indices 54 and 44.

Before proceeding to explain the operation and use of the instrument the detailed structure of a preferred form of the device will be described. It will be understood that a wide variation of structure is possible within the scope of the invention, and that the details to be disclosed are not intended to limit the invention to the form illustrated and described.

Figure 5:
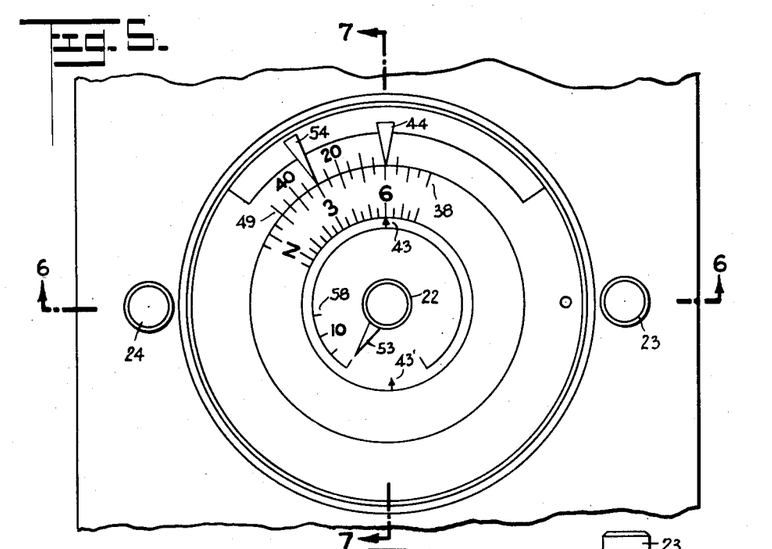
Fig. 5 is a top view of the central portion of the device, including the indicators of wind velocity, wind direction, heading, course and drift.
Figure 6:
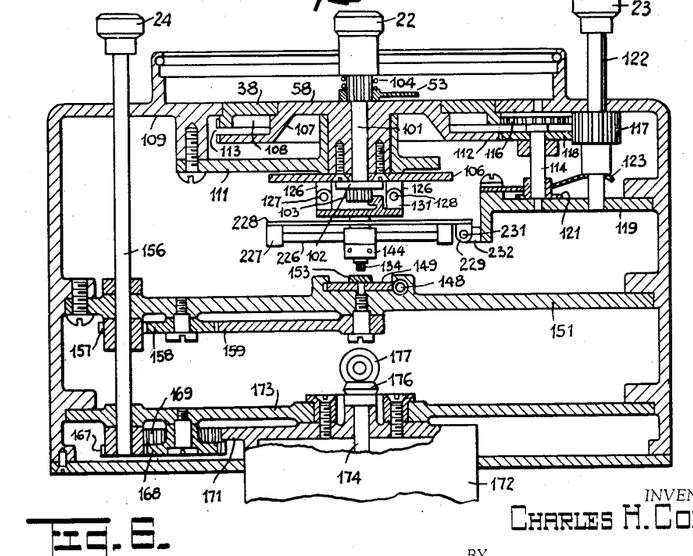
Fig. 6 is an elevation in section on the line 6—6 of Figure 5.
Figure 7:
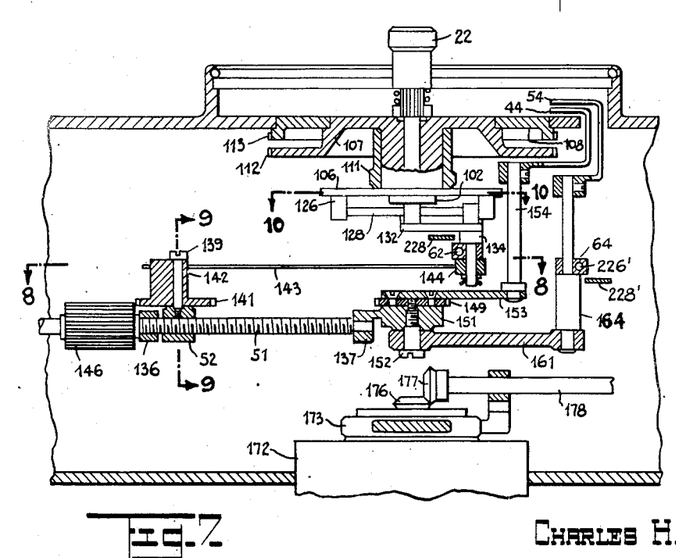
Fig. 7 is an elevation in section on the line 7—7 of Figure 5.
Figure 8:
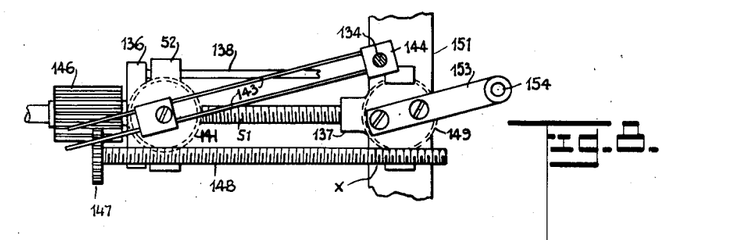
Fig. 8 is an internal top view of the triangulation mechanism, on the line 8—8 of Figure 7.
Figure 9:
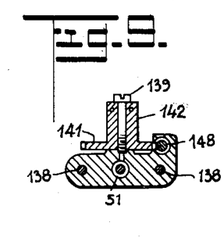
Fig. 9 is a fragmentary section on the line 9—9 of Figure 7.
Figure 10:
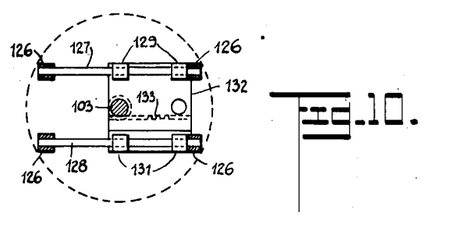
Fig. 10 is a fragmentary section on the line 10—10 of Figure 7.

The mechanism for establishing and maintaining the elements of wind velocity, wind direction, heading, course and drift, is illustrated in Figures 5, 6, and 7 and subsidiary parts thereof are shown in Figures 8, 9, and 10. Insofar as possible the parts in these figures are given the same numbers as the same parts shown diagrammatically in Figure 4.

In the center of this mechanism are the scales and pointers comprising the indicators. The wind velocity knob 22 is located in the center and is carried upon shaft 101, at the lower end of which is friction collar 102 and pinion 103. Carried upon shaft 101 so that it is axially slidable is hand 53, which is turned by and with knob 22 and shaft 101 to indicate against scale 58.

Under the influence of spring 104 which presses between knob 22 and the hub of hand 53, friction collar 102 is normally held in engagement against plate 106. By pressing down on knob 22 collar 102 is disengaged from its frictional contact on plate 106 and knob 22 with shaft 101 and pinion 103 may be turned.

Shaft 101 is journalled within member 107, the upper surface of which carries dial 58 and indices of wind direction 43 and 43'.

Concentric with and carried upon member 107 is member 108, which carries upon its upper surface the direction dial 38.

Concentric with and external to both members 107 and 108 is that portion of the case 109 which immediately surrounds member 108. Upon a part of this portion is carried drift dial 49. Cooperating with this dial 49 and with direction dial 38 are indices 44 and 54, a segment of the case 109 being cut away immediately adjacent dial 49 to permit these indices to be connected to the proper parts of the mechanism situated below the level of the dials.

Member 107 has a central cylindrical portion which is journalled within the corresponding part of member 111, and which carries at its lower surface the plate 106 previously mentioned. Member 111 is secured to the case 109.

Member 107 carries at its outer diameter a gear 112, and member 108 carries a similar gear 113. Fixed upon a shaft 114 is an intermediate gear 116 which meshes with gear 113 and which also meshes with pinion 117 in the normal upper position of pinion 117 (as shown in Figure 6). Freely rotatable on shaft 114 is a second intermediate gear 118 which meshes with gear 112 and also meshes, at all times, with pinion 117.

Shaft 114 is journalled between the case 109 and a member 119 which is secured to the case 109. At its end adjacent member 119, shaft 114 carries a friction collar 121 which in the position illustrated rests lightly upon member 119, but which may be tightly pressed against member 119 in a manner to be described.

Also journalled between case 109 and member 119 is shaft 122 which carries pinion 117 and also knob 23, at its upper end. Knob 23 and shaft 122 may be moved axially, but are normally held in their upper (illustrated) position by the spring 123. In this position, as has been stated, pinion 117 meshes both with gear 116 and with gear 118. By pressing down on knob 23, shaft 122 and pinion 117 are moved axially against spring 123, which is caused to press upon friction collar 121 to hold that collar tight against member 119, and to prevent the rotation of shaft 114 and gear 116. In this lower position pinion 117 is out of mesh with gear 116 and its rotation by means of knob 23 turns only gear 118 and gear 112. Hence member 107, and indices 43 and 43′ carried thereon, are turned, while member 108 and dial 38 are held stationary.

Returning now to plate 106 which is carried upon and turns with member 107, and referring particularly to Figure 10 wherein plate 106 (being above the plane of the section) is represented by a circle in broken line, plate 106 carries upon it the wind velocity mechanism which establishes and maintains the distance of point P away from the axis O. Attached to plate 106 are four posts 126, between pairs of which are carried two slide-wires 127 and 128. Slidable on these wires are two pair of posts 129 and 131. Attached to posts 129 and 131 is plate 132 which carries upon its upper surface a rack 133 which meshes with pinion 103. Plate 132 carries upon its lower surface a post 134.

By means of knob 22, therefore, turning pinion 103 and hence sliding rack 133 and plate 132, post 134 may be placed at any distance from the axis O, and this distance will be indicated on the scale 58 by index 53.

Referring now particularly to Figures 7, 8, and 9, the mechanism for establishing and maintaining the air speed-wind-ground speed triangle OPQ will be described. Threaded shaft 51 is journalled in members 136 and 137 which are secured to the case 109. Carried upon shaft 51 is slider 52, which is moved axially along slide-wires 138 by turning shaft 51.

Pivoted on slider 52 by means of bearing screw 139 is gear 141 having an upward extension 142 through two holes in which wires 143 may slide. These wires 143 are secured to block 144 which is journalled upon post 134.

This distance of pivot screw 139 (which marks axis Q) in slider 52, from axis O, is the same function of the air speed as the distance of post 134 (which marks axis P) from axis O, is of the wind velocity. Hence the distance from pivot screw 139 to post 134 is the same function of the ground speed, and the angle between post 134, screw 139 and axis O is the drift angle PQO=Δ.

The mechanism for transferring this angle PQO from the axis Q to the axis O will now be described. On shaft 51, and turning with it, is gear 146. Meshing with gear 146, but free to move axially in respect to it, is gear 147 which is secured to shaft 148. For the greater portion of its length, up to the point X, shaft 148 is threaded with a thread of the same pitch as shaft 51 but with the reverse inclination. That is, if shaft 51 carries a right-hand thread, shaft 148 carries a left-hand thread of the same pitch. On the portion of its length beyond point X shaft 148 carries a series of annular rings or grooves, of the same distance from each other as the pitch of the thread on the threaded portion. This annular ring portion may be considered as the surface which would be generated by the rotation of an element of a rack about the axis of the shaft 148.

The threaded portion of shaft 148 meshes with gear 141, the teeth of which are inclined at the same angle as the thread on the shaft. The annular ring portion of shaft 148 meshes with a spur gear 149 which is carried upon member 151 which is secured to the case 109. Gear 149 turns upon screw pivot 152, the axis of which coincides with the axis O. Gear 149 carries upon it arm 153 at the end of which is mounted post 154. At the upper end of post 154 index 44 is mounted.

It will now be seen that this mechanism, which is only one of several which might have been selected for the purpose, serves to transmit the angular motion of gear 141 to gear 149 and hence to index 44, independent of the axial motion of slider 52 and gear 141 along shaft 51.

With slider 52 in a given position, shaft 51 and gear 146 both being stationary, shaft 148 acts simply as a rack in transmitting the motion of gear 141 to gear 149. As gear 147, which is fixed to shaft 148, is in mesh with gear 146, no rotation of shaft 148 is possible, and its threaded portion and its annular ring portion act the same in transmitting its linear axial motion.

Linear motion of slider 52, without any angular motion of gear 141, results in no transmission of motion to gear 149. This is so because the axial motion which would be imparted to shaft 148 by the sliding of gear 141 is exactly compensated by the rotary motion of shaft 148 due to the meshing of its gear 147 with gear 146.

The mechanism for angularly adjusting the position of index 54, for establishing the position of the drift factor control mechanism, and for orienting the synchronizer, will next be described. Shaft 156 carries at its upper end knob 24, by means of which it is turned. Fixed on shaft 156 is pinion 157 which meshes with intermediate gear 158, which in turn meshes with sector 159. Both sector 159 and gear 158 are pivotally supported on member 151 which is secured to case 109. Sector 159 has formed with it arm 161 which carries post 164. On post 164 is journalled block 64 which controls the position of the wheel in the drift factor transmission, and on the upper end of post 164 index 54 is secured.

On shaft 156 is also fixed pinion 167 which meshes with first intermediary gear 168. Gear 168 meshes with second intermediary gear 169 and gear 169 meshes with gear sector 171 on the housing of the synchronizer 172. Gears 168 and 169 and synchronizer 172 are pivotally carried upon member 173 which is secured to case 109.

The internal mechanism of the synchronizer 172 is driven by shaft 174 which in turn is driven by bevel gears 176 and 177. The latter gear 177 is mounted upon and driven by shaft 178, which is the output shaft of the altitude transmission. The drive of the synchronizer mechanism is thus independent of the angular position of the synchronizer 172.

This angular position, as illustrated, will correspond to the angular position of index 54 on scale 49, but in the opposite direction, due to the use of the two intermediary gears 168 and 169 for turning sector 171, and only one intermediate gear 158 for turning sector 159. This is because the optical system to be later described reverses the angle of the synchronizer. Had another non-reversing optical system been selected for illustration, the second intermediate gear 169 would have been omitted, and sector 171 driven directly by gear 168. Sector 171 and synchronizer 172 would in that case turn through the identical angle indicated by index 54 on scale 49.

The variable speed transmissions, as illustrated in Figures 11, 12, 13, and 14, will now be described. It must be understood that this particular form of variable speed transmission has been selected simply for convenience of illustration, and that any suitable form of variable speed transmission may be substituted for that shown. Also it must be understood that the complete device employs four such mechanisms, each of which may be identical with the others. Hence only one is illustrated. It corresponds in function to the wheel and cone combinations C—B, E—D, G—H and J—K of Figure 4.

While either the wheel or the cone may be the driver, in describing the mechanism the cone will be considered as the driver, as in combinations C—B and E—D. To apply the mechanism to combinations G—H and J—K, where the wheel is the driver, the description must be reversed.

Figure 11:
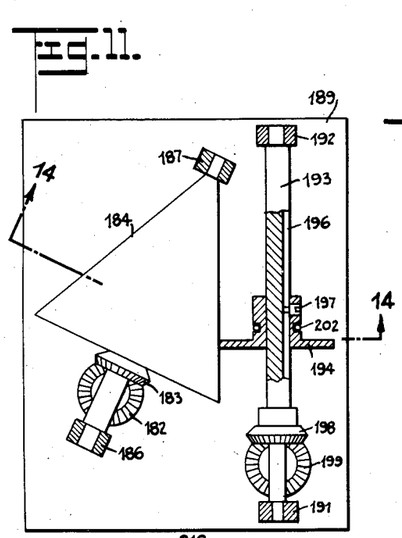
Fig. 11 is a horizontal section of a typical variable speed transmission unit, of which four are included in the device, on the line 11—11 of Figure 14.
Figure 14:
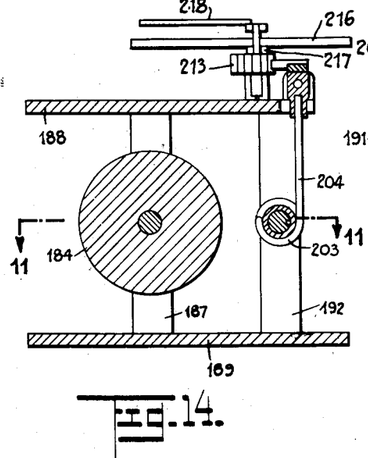
Fig. 14 is a vertical section of the same unit, on the line 14—14 of Fig. 11.

Input shaft 181 carries pinion 182 which drives crown gear 183. Gear 183 is secured to the cone 184 which is journalled in brackets 186 and 187. These brackets are secured between plates 188 and 189. Plate 189 is secured to the case 109 by means not shown.

Between plates 188 and 189 are a second pair of brackets 191 and 192, in which is journalled shaft 193. Axially slidable on shaft 193 is wheel 194. A groove 196 in shaft 193 and a pin 197 carried by wheel 194 permits relative axial motion while assuring joint angular motion. Shaft 193 also carries crown gear 198 which meshes with pinion 199 carried upon output shaft 201.

Hence the drive is from input shaft 181 through pinion 182 and gear 183 to cone 184, from cone 184 to wheel 194, pin 197, groove 196, shaft 193, gear 198, pinion 199 to output shaft 201.

The hub of wheel 194 has a groove 202 in which rides the hooked end 203 of a wire actuator 204. Actuator 204 is carried by one post 206 of a slider 207, which by means of holes in posts 206 and 208 is slidable on wire 209. Wire 209 is secured to posts 205 and 210 which are attached to plate 188. An extension of post 208 provides an actuating connection for the positioning of the wheel.

Figure 12:
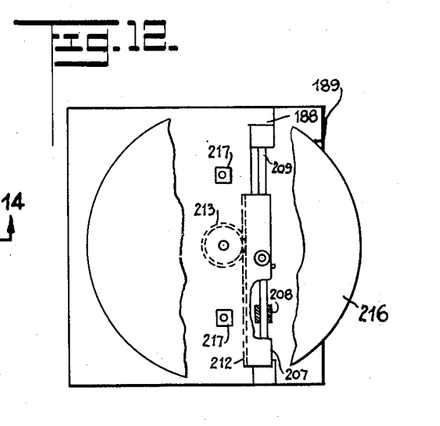
Fig. 12 is a top view of the same transmission unit, in which the hand is removed and the central portion of the dial is cut away.
Figure 13:
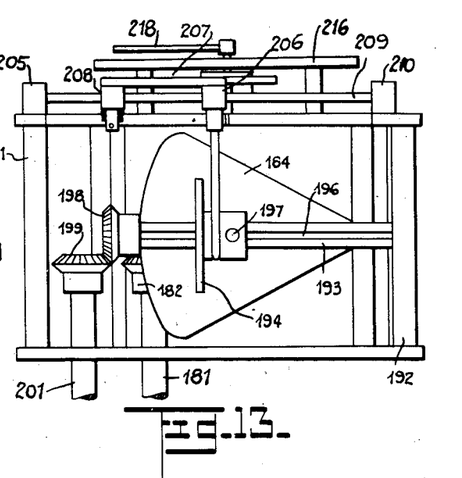
Fig. 13 is a side elevation of the same unit.

Cut upon the edge of slider 207 is rack 212 which meshes with pinion 213, carried upon shaft 214. Shaft 214 is journalled between plate 188 and dial plate 216 which is supported above plate 188 on posts 217. On the extension through dial plate 216 of shaft 214 is carried hand 218 which cooperates with a dial on dial plate 216 to indicate the position of wheel 194. The dials carried on dial plate 216 correspond to the dials 36, 37, 39 and 40 of Figure 4, while the hand 218 corresponds to indicators 31, 32, 34, and 35 of Figure 4.

Figures 15, 17, 18:
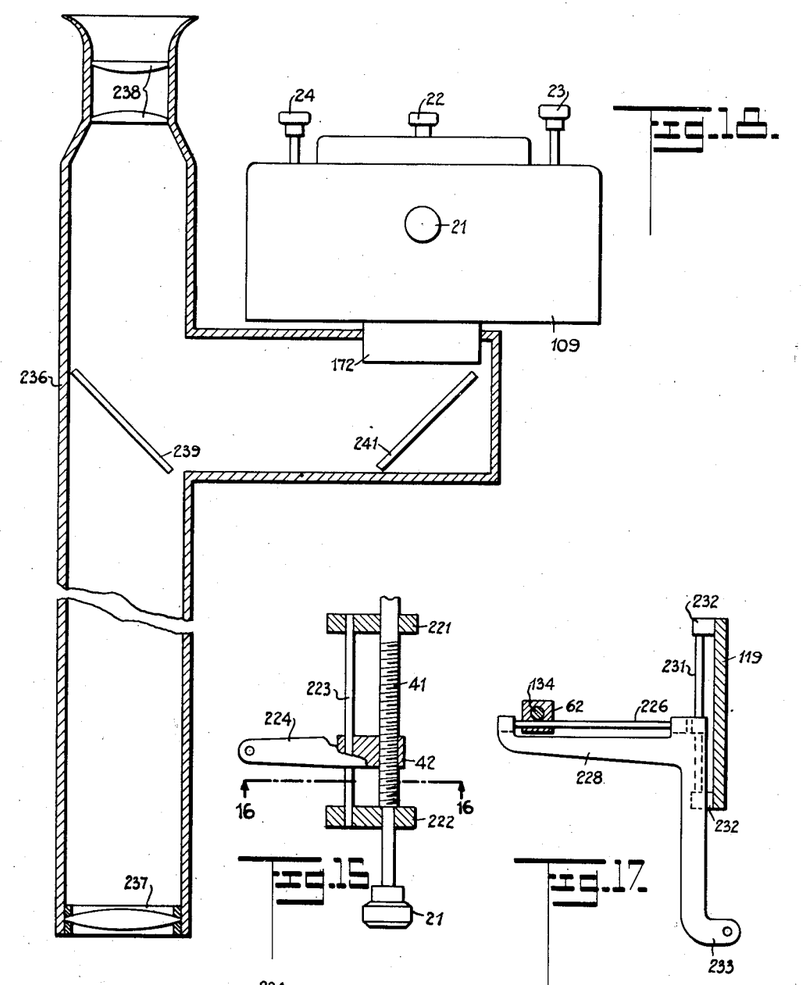
Fig. 15 is a top view partly in section of the mechanism for establishing and maintaining the position of the wheel of the air speed transmission, and which is also a representation of the mechanism for establishing and maintaining the position of the wheel of the altitude transmission.
Fig. 17 is a top view partly in section on the line 17—17 of Figure 6, of the mechanism for establishing and maintaining the position of the wheel of the component wind transmission, and which is also a representation of the mechanism for establishing and maintaining the position of the wheel of the drift factor transmission.
Fig. 18 is a diagrammatic representation of the complete device applied to an optical system for simultaneous observation of the synchronizer element of the device and of the ground.
Figure 16:
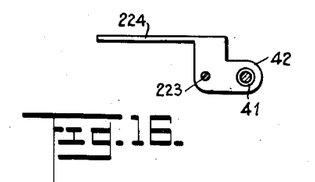
Fig. 16 is a sectional view on the line 16—16 of Figure 15, showing the follower element which constitutes the connection between the control mechanism and the transmission mechanism.

The actuators which control the positions of the wheels of the transmissions are of two kinds: manual for the air speed transmission B—C and for the altitude transmission J—K, and automatic for the component wind transmission D—E and the drift factor transmission G—H. The manual type of actuator is illustrated in Figures 15 and 16. Although it will be described in its function as the actuator of the air speed transmission it will be understood that the same type of actuator is equally adaptable to the control of the altitude transmission.

The threaded shaft 41 is journalled in bearings 221 and 222 both of which are secured to case 109 by means not shown. Carried on the threaded shaft 41 and slidable on wire 223 is slider 42. Slider 42 incorporates an arm 224 which has a hole which fits over the extension of post 208 of the transmission control slider 207. Linear motion is imparted to slider 42, and hence to slider 207, by turning shaft 41 by means of knob 21.

The automatic actuator shown in Figure 17 will be described as the actuator of the component wind transmission, although it must be understood that the same type of mechanism is equally adaptable to the actuation of the drift factor transmission. Parts of these actuators, both for the component wind transmission and for the drift factor transmission, are also shown in Figures 6 and 7.

The post 134 has journalled upon it block 62 which is slidable on wire 226. Wire 226 is supported in posts 227 of bracket 228. Bracket 228 also carries post 229 which is slidable on wire 231. Wire 231 is supported in posts 232 secured to a downward extension of member 119, which, as has been previously explained, is attached to case 109. Bracket 228 has an extending arm 233, corresponding to extension 224 of slider 42, which has a hole which fits over the extension of post 208 of slider 207 of the transmission mechanism. The position of the wheel in the transmission is therefore maintained in accordance with the motion of post 134 parallel to wire 231.

A similar actuator mechanism controls the position of the wheel in the drift factor transmission in reference to post 164 which carries block 64 (corresponding to block 62 in the actuating mechanism just described) which slides on wire 226' and moves bracket 228'.

A general arrangement of the whole device is shown in Figure 18. It must be understood that many other arrangements may be employed to obtain the same results, within the scope of this invention. The arrangement shown, diagrammatically, in Figure 18 is merely by way of illustration of one possible embodiment of my invention.

The case 109 enclosing the complete mechanism device is shown in outline and upon it are shown control knobs 21, 22, 23, and 24. The synchronizer 172 extends through the bottom of the case 109, into the optical system of a telescope 236. The telescope comprises an objective 237, an eye-piece 238, a plane glass 239 and a mirror 241. The plane glass 239 is placed at an angle of 45° to the axis of the telescope connecting the objective 237 with the eye-piece 238, and the mirror 241 is placed at an angle of 90° to the plane of glass 239. The mirror 241 is placed in such relation to the synchronizer 172, and the focal lengths of the objective and the eye-piece are so chosen, that the synchronizer 172 is seen in the telescope superimposed upon the earth, the image of which is thrown into the telescope by the objective. The apparent rate and direction of movement of the earth relative to the aircraft and the apparent rate and direction of movement of the synchronizer can thus be observed simultaneously in relation to each other, and by means of the mechanism provided by this invention the apparent rate and direction of movement of the synchronizer may be made to coincide with the apparent rate and direction of movement of the earth. It will be noted that the apparent direction of the synchronizer, with the optical system illustrated, is the reverse of its actual direction. Hence the reverse movement of synchronizer 172 and drift index 54, which has been previously explained.

Now having described the entire detailed structure of a preferred form of the device, its operation and use will be explained, by reference to the diagrammatic representation of Figure 4.

It is first to be assumed that the aircraft carrying this device is in flight, that the ground or water is visible, and that the height of the ground or water, above sea-level, is known. The altitude of flight of the aircraft is assumed to be known, and also its air speed and heading. In other words, the problem is that referred to in the first part of this specification as the first problem intended to be solved by this device. The constant speed power unit is assumed to be in operation.

Dial 36 will first be set, by means of knob 21, to indicate the known air speed.

Dial 40 will be set, by means of knob 25, to the known altitude of the aircraft over the land or water (that is, to the altitude of the aircraft above sea-level minus the height of the land or water above sea-level).

Dial 38 will be set, by means of knob 23, to indicate the heading of the aircraft.

Dial 58 will be set, by means of knob 22, to indicate zero wind velocity. Dial 37 will then also indicate zero component wind.

A preliminary observation will be made through the device, noting the relative movement between the ground or water and the synchronizer. The latter will be oriented for drift by means of knob 24, so that the earth or water appears to move parallel to the lines of motion of the synchronizer. It will be noted if the earth appears to move faster or slower than the synchronizer. If faster, the wind direction index 43 (that showing the direction toward which it is blowing) will be set, by means of knob 23, to agree with the heading index 33. If slower, the wind direction will be set to 180° from the heading.

While continuing to observe the ground through the device, in reference to the synchronizer, knob 22 will be turned to increase the wind velocity indication on dial 58 until the synchronizer appears to move at the same rate as the earth.

This having been accomplished, the device is synchronized, and the ground speed indicator T and the ground distance indicator M are indicating correctly.

As there is an indication of drift, however, and as the wind has been assumed to be the direction of heading or 180° therefrom, index 44 will have remained on zero (at index 33) while index 54 will be indicating the drift on scale 49. In other words the wind has been assumed to comprise only its component in the direction of heading, and component wind scale 37 will indicate the same value as wind scale 58 (except that the component wind value will be negative if the wind direction setting is 180° from the heading).

To substitute the actual wind for its component, it is now necessary to rotate the wind direction index 43, by means of knob 23, away from index 33 (or from 180° therefrom) in the direction of drift index 54, at the same time increasing the wind velocity indication on scale 58 so that the component wind value on scale 37 remains constant.

As the wind index 43 is moved, the drift index 44 will follow, and when index 44 reaches the position of coincidence with drift index 54, the correct value of actual wind is indicated on scale 58 and its correct direction is indicated by the position of index 43 on scale 38. Furthermore, the mechanism is so arranged that these values for wind velocity and direction remain so set until changed by manipulation of knobs 22 and 23.

It will be seen that this operation of substituting the actual wind for the component wind has in no way affected the operation of ground speed and distance indicators, which had previously been given their proper rates of actuation.

It will be seen that the indices 54 and 44, while showing the angle of drift on scale 49, also indicate the course, or direction of actual path over the ground, by reference to scale 38. Since, in navigation from point to point, it is the course rather than the heading which must be properly maintained, it can now be noted if the indicated direction of course is the course desired. If not, the knob 23 is turned, actuating dial 38 and index 43 together, until the correct course is indicated by index 44 on dial 38. The aircraft will now be turned until its new heading is that indicated by the position of dial 38 in reference to index 33, and the proper readjustment of ground speed and ground distance actuation will be effected by turning knob 24 to bring index 54 again into coincidence with index 44.

Similarly, when it is desired to direct the aircraft along any new course, the knob 23 is turned, orienting dial 38 and index 43 until the new course is indicated by the position of dial 38 against index 44. The correct heading to which the aircraft is to be steered is now indicated by the position of dial 38 against index 33. Bringing index 54 again into coincidence with index 44 completes the establishment of the new ground speed and distance actuation.

If the air speed of the aircraft is changed, the setting of index 31 on scale 36 is changed accordingly, by turning knob 21. This will alter the position of index 44 on dial 38 which, together with index 43, must be turned by means of knob 23 to restore the relation between index 44 and dial 38, assuming that the course is to be maintained. Turning knob 24 to bring index 54 back to coincidence with index 44 completes the resetting of the mechanism to give correct actuation to ground speed and distance indicators.

It will be appreciated that, inasmuch as the ground distance indication has assumed the new correct rate of increment for each new condition of course, air speed, etc., it has maintained a continuous and accurate record of the length of the flight path in reference to the ground.

It will have been noticed that no reference has been made to the altitude setting, to the wind, nor to the observance of the ground, after the original observations were made to determine the velocity and direction of the wind. Assuming that the wind velocity and direction remain constant, therefore, the instrument continues to give correct values for drift, heading, ground speed and ground distance, for any course and any air speed, without continued observation of the ground, and hence is particularly valuable when weather conditions made continuous ground observation impossible.

On the other hand, so long as the ground or water is visible, continuous observations may be made, and used to continuously correct the wind velocity and direction values as the wind changes from time to time. In such case the manipulation of the device is exactly as previously described, except that in addition the altitude indicator 35 is readjusted against scale 40, by means of knob 25, to show the correct height above the ground at the time of each observation, and any lack of synchronization is eliminated by wind velocity and direction adjustments as previously described.

Having thus illustrated, described and explained my invention and its use, what I claim and desire to protect by Letters Patent, are:

1. In an indicator for aircraft, having variable ratio transmissions, each having a driven shaft and a driving shaft the speed ratio of which shafts is variable and differential devices, each having two driving shafts and a driven shaft wherein the speeds of the two driving shafts are combined to give the speed of the driven shaft, a first transmission, the ratio of which is a function of air speed; a second transmission, the ratio of which is a function of a constant plus the component velocity of the wind in the direction of heading of the aircraft; a first differential device, one driving shaft of which is driven from the driving shaft of said second transmission and the other driving shaft of which is driven from the driven shaft of said second transmission and the driven speed of which is a function of the component velocity of the wind in the direction of heading of the aircraft; a second differential device, driven by said first transmission and by said first differential device, the driven speed of which is a function of the sum of the air speed and the component velocity of the wind in the direction of heading of the aircraft; a third transmission, driven by said second differential device, the ratio of which is an inverse function of the cosine of the angle of drift; and an indicator driven by said third transmission.

2. An indicator in accordance with claim 1, with a fourth transmission, driven from said third transmission, the ratio of which is an inverse function of altitude; and a synchronizer driven from said fourth transmission.

3. An aircraft navigating instrument comprising a variable ratio transmission the ratio of which is proportional to the airspeed of the aircraft, a second variable ratio transmission the ratio of which is proportional to the component of the velocity of the wind in the direction of the heading of the aircraft, a third transmission, said third transmission being a differential transmission driven by both said first and second transmissions, a fourth transmission driven by said third transmission, said fourth transmission being a variable ratio transmission the ratio of which is inversely proportional to the cosine of the angle of drift of the aircraft, and an indicator of a function of the ground speed of the aircraft, driven by said fourth transmission.

4. An aircraft instrument comprising three control members, three variable ratio transmissions each having an input shaft and an output shaft, two differential devices each having two input shafts and one output shaft, a mechanical triangle having a heading arm, a wind arm and a course arm, an indicator of air speed, an indicator of wind velocity, a scale of directions, a scale of drift angle, an index of heading, an index of wind direction, an indicator of component wind velocity in the direction of heading, an index cooperating with said scale of directions to show course and with said scale of drift angle to show drift angle, an indicator of a function of drift angle, and an indicator of a function of the ground speed of said aircraft; wherein the adjustment of the first member determines the ratio of the first transmission, determines the length of said heading arm and determines the indication of air speed; the adjustment of the second member determines the length of said wind arm and determines the indication of wind velocity; the adjustment of the third member determines the position of said scale of directions in respect to said index of heading, determines the angular position of said wind arm and determines the position of said index of wind direction in respect to said scale of directions; the length and angular position of said wind arm determines the ratio of the second transmission and determines the indication of component wind velocity; one input shaft of the first device driven at a speed proportional to the speed of the input shaft of said second transmission and the other input shaft of said first device driven at a speed proportional to the speed of the output shaft of said second transmission; one input shaft of the second device driven at a speed proportional to the speed of the output shaft of said first transmission and the other input shaft of said second device driven at a speed proportional to the speed of the output shaft of said first device; said course drift index indicates the angular position of said course arm, determines the ratio of the third transmission and determines the position of said indicator of a function of the drift angle; the input shaft of said third transmission driven at a speed proportional to the speed of the output shaft of said second device; and the output shaft of said third transmission drives said indicator of a function of ground speed.

5. An aircraft instrument according to claim 4 including a fourth control member, a fourth variable ratio transmission, an indicator of altitude and a synchronizer adapted for observation in respect to the apparent movement of the earth; wherein the adjustment of said fourth member determines the ratio of said fourth transmission and determines the indication of altitude; said fourth transmission driven from the output shaft of said third transmission and said fourth transmission drives said synchronizer.

6. An instrument for aircraft comprising in combination an indicator of a function of the ground speed of the aircraft, a synchronizer, an element driven at a speed proportional to the air speed of the aircraft, a second element driven at a speed proportional to a component of the wind velocity, a third element driven jointly by said first two elements and a fourth element driven by said third element at a speed proportional to the speed of said third element and inversely proportional to the cosine of the angle of drift of said aircraft, said fourth element driving said indicator at a speed directly proportional to its own speed and driving said synchronizer at a speed directly proportional to its own speed and inversely proportional to the altitude of the aircraft.

7. An instrument for aircraft comprising in combination an indicator of a function of the ground speed of the aircraft, a synchronizer, an element driven at a speed proportional to $v$, a second element driven at a speed proportional to $w \cos \alpha$, a third element driven jointly by said first two elements at a speed proportional to $v + w \cos \alpha$, and a fourth element driven by said third element at a speed proportional to $$\frac{v + w \cos \alpha}{\cos \Delta}$$

said fourth element driving said indicator at a speed proportional to its own speed and driving said synchronizer at a speed proportional to $$\frac{v + w \cos \alpha}{H \cos \Delta}$$

where $v$ is the air speed of the aircraft, $w$ is the velocity of the wind, $\alpha$ is the angle between the direction of heading of the aircraft and the direction of the wind, $\Delta$ is the angle of drift of the aircraft, and H is the altitude of the aircraft.

8. An instrument for aircraft as in claim 7, including indicators of the values of $v$, $w$ $\Delta$ and H.

9. In an indicator for aircraft, having variable ratio transmissions, differential devices and indicators: a first transmission, the ratio of which is a function of air speed, and an indicator of such ratio in terms of air speed; a second transmission, the ratio of which is a function of a constant plus the component velocity of the wind in the direction of heading of the aircraft, and indicators of said velocity and direction of the wind; a first differential device, the driven speed of which is a function of the component velocity of the wind in the direction of heading of the aircraft; a second differential device, driven by said first transmission and by said first differential device, the driven speed of which is a function of the sum of the air speed and the component velocity of the wind in the direction of heading of the aircraft; a third transmission, driven by said second differential device, the ratio of which is an inverse function of the cosine of the angle of drift, and an indicator of said angle of drift; and an indicator of a function of ground speed driven by said third transmission.

10. An indicator in accordance with claim 9, with a fourth transmission, driven from said third transmission, the ratio of which is an inverse function of altitude, and an indicator of said altitude; and a synchronizer driven from said fourth transmission.

CHARLES H. COLVIN.